_United States Patent_ [19]

Bader

[11] Patent Number: 4,652,042
[45] Date of Patent: Mar. 24, 1987

[54] DESIGN COLUMN AND DOOR SYSTEM FOR HIGHWAY TRAILERS

[76] Inventor: Samuel M. Bader, 225 Howe St., Elyria, Ohio 44035

[21] Appl. No.: 739,472

[22] Filed: May 30, 1985

[51] Int. Cl.⁴ ............................................. B60J 5/04
[52] U.S. Cl. ..................................... 296/181; 296/155
[58] Field of Search ................ 296/181, 183, 50, 155, 296/146; 160/207, 211, 214, 221, 222, 189, 188, 202

[56] References Cited

U.S. PATENT DOCUMENTS

| | | | |
|---|---|---|---|
| 2,057,850 | 10/1936 | Sims | 160/188 |
| 2,623,779 | 12/1952 | Catell | 160/188 |
| 2,967,567 | 1/1961 | Heckerman | 160/222 |
| 3,572,815 | 3/1971 | Hackney | 296/155 |
| 3,698,465 | 10/1972 | Aberg | 160/222 |
| 3,960,196 | 6/1976 | Berner | 160/222 |

FOREIGN PATENT DOCUMENTS 6803697 9/1968 Netherlands ........................ 296/181

Primary Examiner—Robert B. Reeves
Assistant Examiner—Carol L. Olson
Attorney, Agent, or Firm—Richard L. Miller

[57] ABSTRACT

This invention is a truck trailer door system around all sides thereof, including a plurality of vertically telescopic doors supported on telescopic cylinders located in stationary columns located between the doors.

2 Claims, 7 Drawing Figures

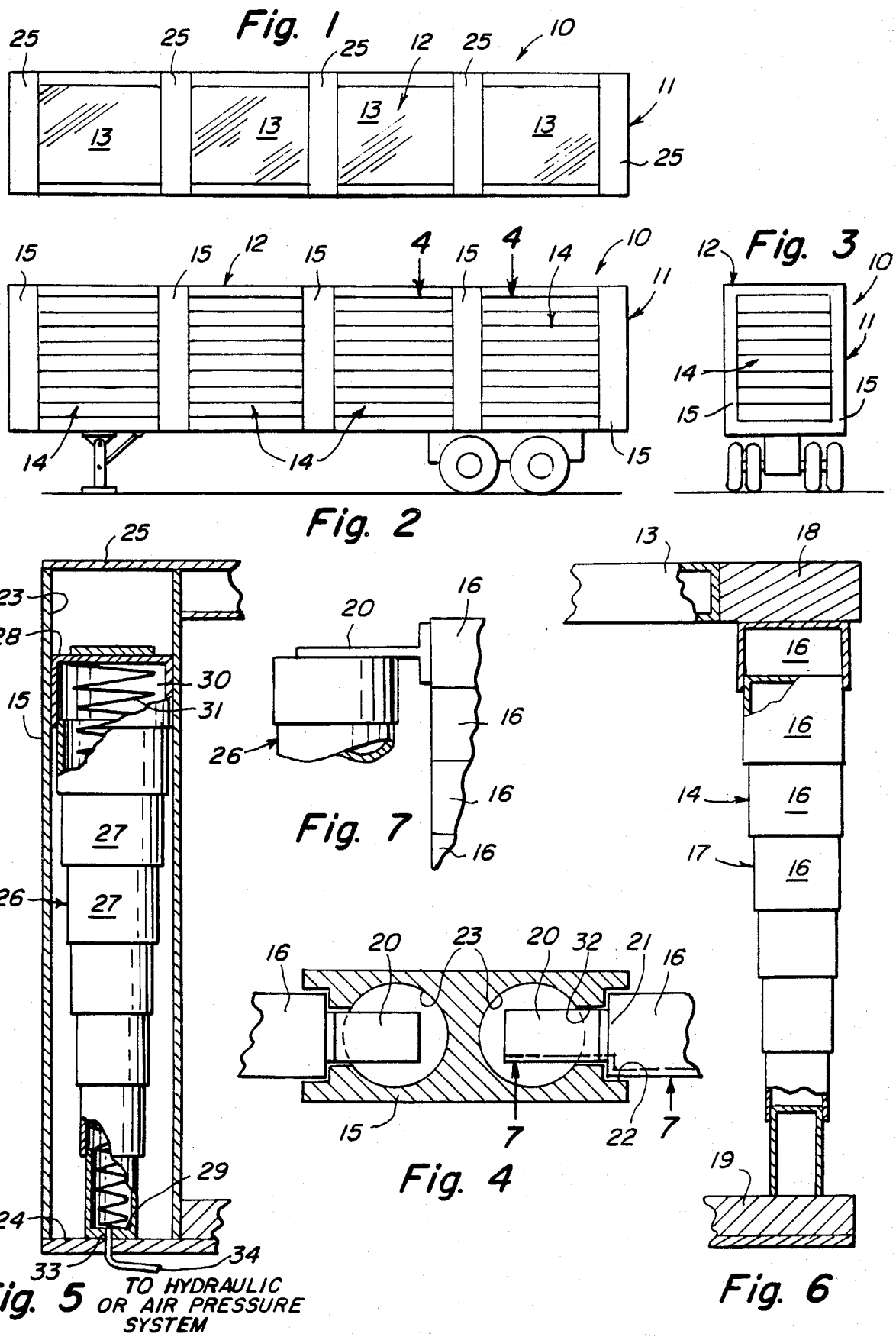

DESIGN COLUMN AND DOOR SYSTEM FOR HIGHWAY TRAILERS

BACKGROUND OF THE INVENTION

This invention relates generally to automotive truck trailers such as are used for transporting large quantities of freight over the highways.

Such trailers are manufactured to be long in order to contain as much freight as possible so that each load earns maximum profits to the trucking firm. Typically such trailers however have only a door at the rear end, so that freight near the front can not be unloaded until the rear freight is removed first, thus necessitating planned loading if some of the content must be unloaded along the way, and if any goods must be also picked up at a same time, it presents problems to reach the next freight due for unloading. This situation is accordingly in need of an improvement.

SUMMARY OF THE INVENTION

Therefore it is a principal object of the present invention to provide a highway trailer having also doors along the full length of each side thereof for easy and quick access to all of the freight as needed along a route without loss of time in reloading to reach inaccessible cargo.

Another object is to provide a highway trailer design that is suitable for all closed top, single trailers, twin trailers or triple trailers.

Yet a further object is to provide a highway trailer design that can be built into existing trailers as well as incorporating it into new trailer manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a top plan view of a trailer vehicle incorporating the instant invention.

FIG. 2 is a side elevational view thereof.

FIG. 3 is a rear end elevational view.

FIG. 4 is a cross sectional view taken on line 4—4 of FIG. 2.

FIG. 5 is a partial cross sectional vertical view taken through a column of FIG. 2.

FIG. 6 is a partial cross sectional vertical view taken through a door of FIG. 2.

FIG. 7 is a fragmentary side view taken on line 7—7 of FIG. 4, showing how the top door panel is mounted on top of either hydraulic or air cylinders.

DETAILED DESCRIPTION OF THE PREFERRED EMBODIMENTS

Referring now to the drawing in greater detail, the reference numeral 10 represents a new design column and door system for highway trailers, according to the present invention, wherein the trailer 11 has a closed roof 12 made of translucent panels 13, and each side thereof as well as the rear is comprised of a plurality of downwardly telescopic doors shown generally at 14 located between stationary support columns 15. Each door comprises a plurality of horizontal longitudinal channels 16 that inter fit into one another when the door is opened and which form a solid vertical door panel 17 when the channels are raised to close a space between a roof header 18 and the trailer floor 19; the channels overlapping one another as shown in FIG. 6. Each channel is cross sectionally an innerted U-shaped with the opposite ends of each channel being left open ended. The uppermost channel includes a longitudinally extending tongue 20 welded to each end thereof. The opposite ends 21 of all the channels are slideable within a vertical receiving slot 22 formed along a side edge of each column, while the tongue 20 project further into the column.

Each column includes two cylindrical, vertical openings 23 therewithin and which extend between a floor base plate 24 and a roof plate 25 that bridges across the trailer roof between columns on opposite sides, and between which the translucent roof panels are supported. Within each cylindrical opening 23 there is a telescopic cylinder 26 comprised of a plurality of snugly interfitting circular sections 27. The uppermost section includes a top wall 28 while a lowermost section includes a bottom wall 29 so as to form a sealed chamber 30 therewithin. A compression coil spring 31 inside the chamber 30 bears between the top and bottom walls, urging the cylinder into an extended condition.

The above described door tongue protrudes through a vertical slot 32 formed between the groove 22 and the cylindrical opening 23; the tongue extending into the cylindrical opening and being welded on top of the top wall 28.

An opening 33 through the bottom wall 29 is fitted with a pipe 34 which connects either to a hydraulic or air pressure system (not shown) and which serves to inflate the cylinder in order to raise the door into a closed position.

In operative use, it is now evident that any door may be selectively opened or closed as wished for placement or removal of cargo.

The system permits separate compartment areas inside the trailer, each being individually locked. The system permits quicker loading and unloading at destinations by several fork lift trucks around the trailer, eliminating need of a dock.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A door system for a highway trailer, comprising, in combination, a plurality of downwardly telescopic doors around a rear and both opposite sides of each trailer, a stationary column between each door, each door comprising a plurality of telescopically interfitting inverted U-shaped channels downwardly telescopic to open the doors, the largest channel being at the top and the channels downwardly decreasing in size, each column comprising a cylindrical vertical hollow shaftway therein adjacent the side end of the door, a vertical slot in said column between the shaftway and the door, a downwardly telescopically enclosed cylinder in each shaftway comprising a plurality of snugly interfitting cylindrical sections, the uppermost section being at the top and the sections downwardly decreasing in size, the uppermost and lowermost section including respective top and bottom walls to complete said enclosed cylinder, a tongue interconnecting only the top of the uppermost channel to the top wall of the cylinder and vertically slidable within said slot, inlet means coupled to each cylinder for communication of external pressure into said cylinder to upwardly extend the cylinder thereby closing the door by lifting it up, and for lowering the door upon removal of said external pressure to open the door, and spring means in said cylinder to urge the cylinder into an extended condition thereby resisting sudden opening the door.

2. A door system as in claim 1, wherein the trailer has a closed roof comprised of a plurality of horizontal translucent panels bridging opposing columns on each said of the trailer and roof panels spanning adjacent roof plates.

* * * * *